UNITED STATES PATENT OFFICE.

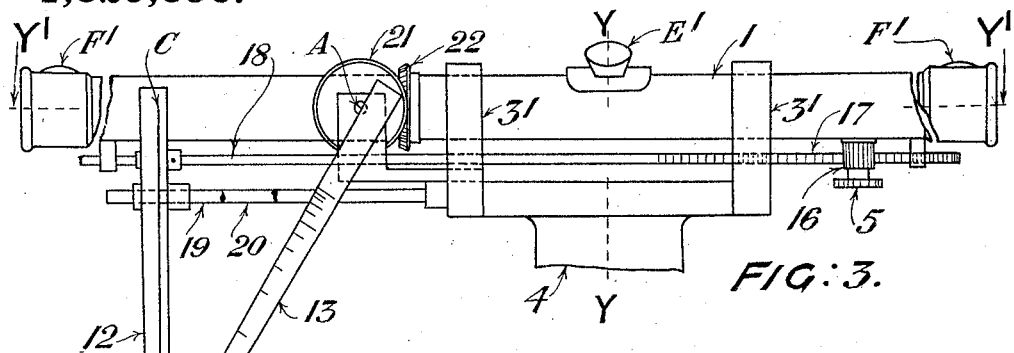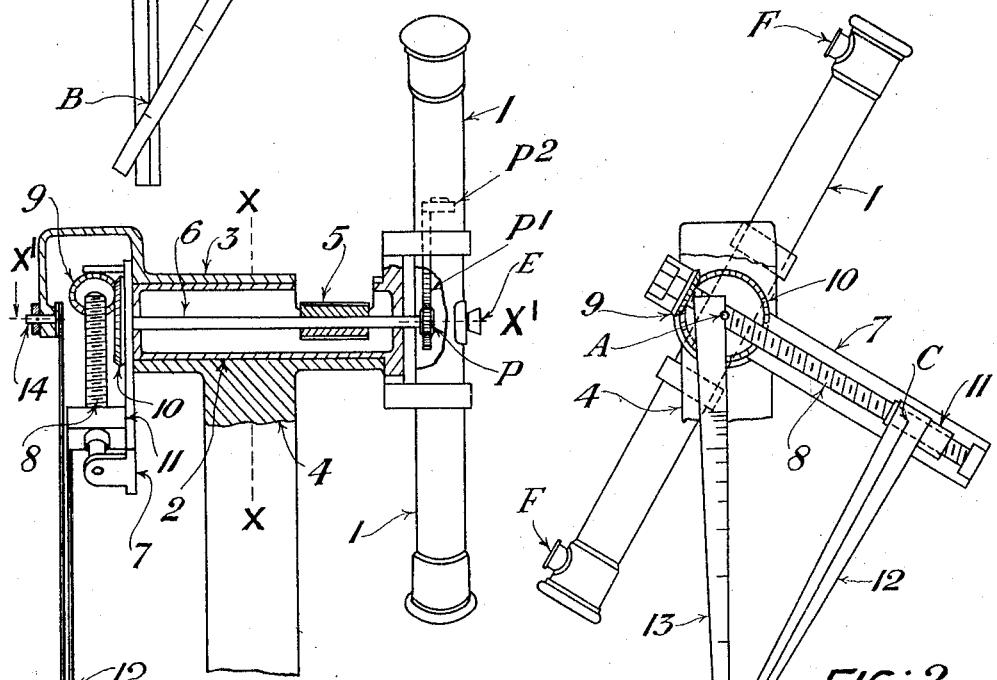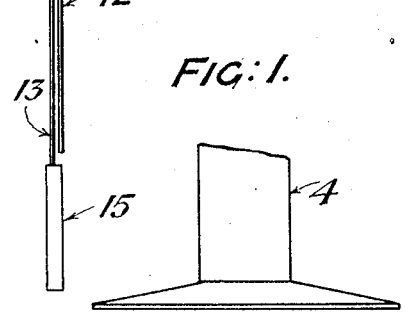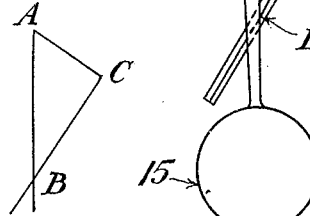

ARCHIBALD BARR AND WILLIAM STROUD, OF ANNIESLAND, GLASGOW, SCOTLAND.

MECHANISM AND RANGE-FINDER FOR MEASURING VERTICAL HEIGHTS.

1,329,356. Specification of Letters Patent. Patented Feb. 3, 1920.

Application filed February 13, 1919. Serial No. 276,842.

*To all whom it may concern:*

Be it known that we, ARCHIBALD BARR and WILLIAM STROUD, subjects of the King of Great Britain and Ireland, and both of Caxton street, Anniesland, Glasgow, Scotland, have invented new and useful Improvements in or Connected with Mechanism and Range-Finders for Measuring Vertical Heights, of which the following is a specification.

The object of this invention is to provide self-contained base single-observer rangefinders of the class in which the range-scale is of the reciprocal type, *i. e.*, one in which the parallaxes are expressible by means of a uniform scale, with height indicating mechanism by the use of which the vertical height of an object with respect to an observing station may be determined, from measurements of the distance to the object in terms according to a reciprocal scale of ranges and the angle of sight from the station to the object.

According to this invention the measurements of distances to be dealt with are transmitted to the height indicating mechanism by mechanical connection with the working head of the rangefinder. Such distance measurements may, for instance, be obtained by using a rangefinder of the type comprising a double telescope system in which the range is measured by the translation of a refracting prism of small angle to and fro along the axis of one of the telescopes operated by means of the working head in the ordinary manner appertaining to self-contained base single-observer rangefinders of the coincidence type.

The principle upon which this invention depends may be explained by way of example as follows:— If $\alpha$ denotes the angle of sight of a target (say an aircraft) with the horizontal, R the range and H height, sin $\alpha =$ $\frac{H}{R}$ which may be written $\frac{1}{R}\Big/\frac{1}{H}$. Thus, if a right angled triangle ACB, see diagram Figure 4 of the drawing, is constructed with the hypotenuse AB vertical, then if CA is directed toward the target and is adjusted in length to be proportional to $\frac{1}{R}$ and if AB be a reciprocal scale of heights on the same scale as CA is one of ranges, (the infinity position of each scale being at A), then the intersection of CB with the height scale will give the height corresponding to the range, since the angle ABC=$\alpha$ the angle of sight, and sin $\alpha = \frac{1}{R}\Big/\frac{1}{H}$ by construction.

According to this invention a rangefinder is provided with mechanism comprising a range member AC the length of which is adjustable so as to be proportional to the reciprocal of the range, a height member AB having graduations representing heights upon the same scale as AC represents the range and an index member CB, the three members being arranged to constitute a right angle triangle of which the range and index members AC, CB, form the sides of the right angle and the height member AB the hypotenuse of the triangle, in conjunction with which adjustment means are provided for effecting adjustments of AC so that its length is made proportional to $\frac{1}{R}$ by actuation of the working head of the rangefinder and for effecting angular adjustments so that the angle ABC is made equal to the angle of sight with the horizontal by actuation of the rangefinder in the process of its being directed upon the target.

Some examples of construction according to this invention will now be described with reference to the accompanying drawing, in which:—

Fig. 1 is an elevation partly in section and Fig. 2 is a side view with portions removed of a rangefinder provided with mechanism according to this invention.

Fig. 3 is an elevation illustrating a modification.

Fig. 4 is the diagram already referred to illustrating the principle upon which the invention is based.

In the construction illustrated at Figs. 1 and 2, 1 designates a rangefinder fixed to an axle 2 which is mounted in a bearing 3 formed at the head of a support 4, the arrangement being such that the rangefinder 1 is capable of azimuthal adjustment about the axis X X of the support 4 and of adjustment for angle of sight about the axis $X^1 X^1$ at right angles to the plane of triangulation containing the base of the rangefinder. The working head designated 5 of the rangefinder is fixed upon a shaft 6 parallel to the axis $X^1 X^1$. At one end of the shaft 6 there is fixed a pinion P engaging with a rack $P^1$ which carries a refracting prism $P^2$ of small angle. The rack $P^1$ is so guided that the prism $P^2$ is adapted to be moved to and fro along the axis of one of the telescopes of the double telescope system of the rangefinder by rotating the working head 5, in order to produce coincidence for determining the range of a target in the ordinary manner appertaining to self-contained base single-observer rangefinders of the coincidence type. The rangefinder illustrated at Figs. 1 and 2 is provided with an eyepiece E the optical axis of which is coincident with the axis $X^1 X^1$, and at right angles to the plane of triangulation. F F designates windows at which the beams of light enter the rangefinder. Fixed to the axle 2 is an arm 7 upon which is mounted a screw 8 supported against endwise movement, the axis of the screw being arranged at right angles to the base of the rangefinder 1 and parallel with the plane of triangulation. Fixed to the screw 8 is a toothed bevel wheel 9 arranged to gear with a toothed bevel 10 fixed to the shaft 6. Upon the screw 8 a nut 11 is mounted capable of endwise adjustment by the screw but prevented from moving angularly about the axis of the screw. Extending from the nut 11 is an arm 12 upon which is provided a straight line CB at right angles to the axis of the screw 8 constituting the index member of the mechanism. The range member is AC, of which A may be intersected by the axis $X^1 X^1$ and represents the infinity position. Extending vertically downward from the axis $X^1 X^1$ is an arm 13, the edge AB of which constitutes the height member, and upon this arm graduations representing a reciprocal scale of heights is marked upon the same reciprocal scale as AC represents the range, the infinity indication of the height scale being at A. The plane of the triangle ABC thus formed is parallel with the plane of triangulation. Under conditions where the support 4 is mounted upon a stationary base, for instance, on land, the arm 13 may be maintained vertical by being rigidly fixed to the support 4, but for use under conditions such, for example, as on board ship the arm 13 may, as shown, be suspended from a pivot 14 so as to swing about the axis $X^1 X^1$ at A and be provided with a weight 15 at its lower end, or otherwise be maintained vertical in the plane of the triangle ABC, for instance, by gyroscopic or other form of pendulum control.

In use, by turning the working head 5 in addition to moving the prism $P^2$ in order to obtain coincidence, AC will be adjusted proportionally to $\frac{1}{R}$ when coincidence is obtained by reason of the motion of the working head 5 being transmitted by means of the shaft 6 to bevel 10, bevel 9, screw 8, nut 11 and with it arm 12, and the angle ABC will be made equal to the angle of sight with the horizontal by reason of AC, CB being fixed to turn with the rangefinder 1 about the axis $X^1 X^1$ which may intersect A. Thus, the intersection of the line CB with the scale upon AB will denote the height for the range and angle of sight of the target under observation.

In the modified form of construction illustrated at Fig. 3, the rangefinder 1 is mounted in bearings $3^1 3^1$ formed at the head of the support 4, the arrangement in this case being such that the rangefinder is capable of azimuthal adjustment about the axis Y Y of the support 4, and of adjustment for angle of sight about the axis $Y^1 Y^1$ in the plane of triangulation of the base of the rangefinder, the axis $Y^1 Y^1$ being the axis of the base of the rangefinder. $F^1 F^1$ are the windows at which the beams of light enter the instrument and $E^1$ is the eyepiece. The optical axis of the eyepiece $E^1$ may conveniently be, as is indicated, at right angles to the plane of triangulation, so that when the plane of triangulation is horizontal the axis of the eyepiece $E^1$ is vertical. In this case the direction of the axis of the eyepiece changes with the adjustments of the instrument about the axis $Y^1 Y^1$ in accordance with varying angles of sight. The position indicated at Fig. 3 corresponds to that for an angle of sight at about 30°.

In the instrument shown at Fig. 3, the working head 5 is arranged to operate a refracting prism in a manner similar to the prism $P^2$ explained with reference to Figs. 1 and 2, for obtaining coincidence in determining range. In addition to a pinion (such as P Fig. 1) for operating the refracting prism there is also fixed to the working head 5 a pinion 16 arranged to gear with a rack 17 formed with a rod extension 18 connected to the arm 12, upon which is marked the straight line CB (at right angles to the horizontal plane containing the axis $Y^1 Y^1$) which constitutes the index member of the mechanism. The arm 12 is mounted to slide laterally on guides 19 and 20 extending from the support 4, and by which it is maintained parallel with the axis Y Y, and the connection between the arm 12 and rod 18 is such as will permit the rod 18 to move laterally with the rangefinder as it is turned about the axis $Y^1 Y^1$, the endwise movements of the rod 18 only affecting the displacement of the arm 12 along the guides 19 and 20 which are parallel to the axis $Y^1 Y^1$. Mounted to turn about an axis at A is the arm 13, the edge AB of which constitutes the height member, and upon this arm a reciprocal scale of heights is marked, the infinity indication of the height scale being at A. Fixed to the arm 13 is a toothed bevel 21 concentric to the axis A which gears with a toothed bevel 22 fixed to the rangefinder concentric to the axis $Y^1 Y^1$. The toothed bevels 21 and 22 are of equal size. The range member is AC, of which A represents the infinity position. The plane of the triangle ABC thus formed is in this case parallel to the vertical plane containing the axis $Y^1 Y^1$. For use on land the support 4 is fixed with its axis Y Y vertical, but for use on board ship the support 4 is suspended so as to swing about an axis parallel to $Y^1 Y^1$ so that the axis Y Y is maintained in a vertical plane containing or parallel with the axis $Y^1 Y^1$.

In use, by turning the working head 5, AC will be adjusted proportionally to $\frac{1}{R}$ by reason of the motion of the working head 5 being transmitted to the rack 17, rod extension 18 to the arm 12, and the angle ABC will be made equal to the angle of sight with the horizontal by reason of AB being geared to turn about A in accordance with the angular movement of the rangefinder about the axis $Y^1 Y^1$. Thus, the intersection of the line CB with the scale upon AB will denote the height for the range and angle of sight of the target under observation.

We claim:

1. A rangefinder provided with mechanism comprising a range member the length of which is adjustable so as to be proportional to the reciprocal of the range, a height member having graduations representing heights upon the same reciprocal scale as the range member represents the range, and an index member, the three members being arranged to constitute a right angle triangle of which the range and index members form the sides of the right angle and the height member the hypotenuse of the triangle, adjustment means for effecting adjustments of the range member so that its length is made proportional to $\frac{1}{R}$ a working head of the rangefinder for actuating the adjustment means, and means for effecting angular adjustments so that the angle contained by the height and index members is made equal to the angle of sight with the horizontal in accordance with the angular movements of the rangefinder in the process of its being directed upon the target, for the purposes set forth.

2. A rangefinder provided with mechanism comprising a range member the length of which is adjustable so as to be proportional to the reciprocal of the range, a height member having graduations representing heights upon the same reciprocal scale as the range member represents the range, and an index member, the three members being arranged to constitute a right angle triangle of which the range and index members form the sides of the right angle and the height member the hypotenuse of the triangle, the plane of the triangle being parallel with the plane of triangulation of the rangefinder, adjustment means for effecting adjustments of the range member so that its length is made proportional to $\frac{1}{R}$ a working head of the rangefinder for actuating the adjustment means and means for effecting angular adjustments so that the angle contained by the height and index members is made equal to the angle of sight with the horizontal in accordance with the angular movements of the rangefinder in the process of its being directed upon the target.

3. A rangefinder provided with mechanism comprising a range member the length of which is adjustable so as to be proportional to the reciprocal of the range, a height member having graduations representing heights upon the same reciprocal scale as the range member represents the range, and an index member, the three members being arranged to constitute a right angle triangle of which the range and index members form the sides of the right angle and the height member the hypotenuse of the triangle, the plane of the triangle being parallel with the plane of triangulation of the rangefinder, and the height member maintained vertical in the plane of the triangle, adjustment means for effecting adjustments of the range member so that its length is made proportional to $\frac{1}{R}$, a working head of the rangefinder for actuating the adjustment means, and means for effecting angular adjustments so that the angle contained by the height and index members is made equal to the angle of sight with the horizontal in accordance with the angular movements of the rangefinder in the process of its being directed upon the target, for the purposes set forth.

ARCHIBALD BARR.
WILLIAM STROUD.